A. W. SCHRAMM & E. B. WILFORD.
WRIST JOINT FOR DENTAL ENGINES.
APPLICATION FILED SEPT. 27, 1912.

1,070,188.

Patented Aug. 12, 1913.

Witnesses.—
William T. Nase
Wills A. Burrowes

Inventors.—
Adolph W. Schramm.
Edward B. Wilford.
by their Attorneys.—
Howson & Howson

UNITED STATES PATENT OFFICE.

ADOLPH W. SCHRAMM, OF RIVERTON, NEW JERSEY, AND EDWARD B. WILFORD, OF MERION, PENNSYLVANIA, ASSIGNORS TO ELECTRO DENTAL MANUFACTURING COMPANY, OF PHILADELPHIA, PENNSYLVANIA, A CORPORATION OF PENNSYLVANIA.

WRIST-JOINT FOR DENTAL ENGINES.

1,070,188.  Specification of Letters Patent.  Patented Aug. 12, 1913.

Application filed September 27, 1912. Serial No. 722,703.

*To all whom it may concern:*

Be it known that we, ADOLPH W. SCHRAMM and EDWARD B. WILFORD, citizens of the United States, residing, respectively, in Riverton, Burlington county, New Jersey, and Merion, Montgomery county, Pennsylvania, have invented certain Improvements in Wrist-Joints for Dental Engines, of which the following is a specification.

One object of this invention is to provide a relatively simple and compact form of belt guiding joint having its parts so arranged as to permit axial angular movement of one of them relatively to the other without causing such a movement of the cord-supporting pulleys as will result in a tightening or slacking of the driving cord guided thereby.

It is further desired to provide a belt guiding joint which in addition to including novel means for supporting cord-guiding pulleys, shall also possess means whereby the positions of these pulleys are caused to change with variations in the relative positions of the parts of the joint, so that the run or runs of the driving cord will not be tightened or slackened on account of such change.

Another object of the invention is to provide novel supporting means for the cord pulleys of a belt guiding joint which shall permit an angular movement of the members in either direction from a straight line position, whereby the plane of the axes of said pulleys is at all times caused to bisect the angle defined by the lines of the two parts of the joint.

These objects and other advantageous ends are secured as hereinafter set forth, reference being had to the accompanying drawing, in which;—

Figure 1:
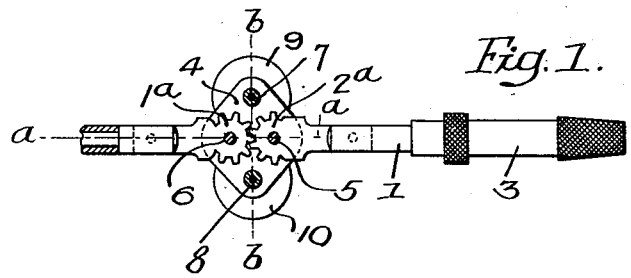
Figure 2:
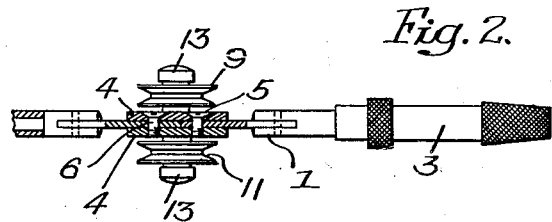
Figure 3:
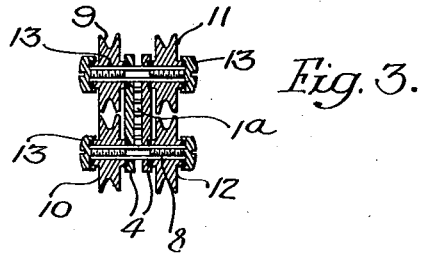

Figure 1, is a side elevation, partly in section, illustrating the preferred construction of a belt guiding joint made according to this invention; Fig. 2, is a horizontal section on the line *a—a*, Fig. 1; Fig. 3, is a vertical section on the line *b—b*, Fig. 1; and, Figs. 4 and 5, are respectively a side elevation, partly in section, and a plan, showing the invention as applied to a belt guiding joint having one instead of two pairs of cord pulleys.

In the above drawings, 1 and 2 represent the main portions of the joint proper and the first of these has mounted upon it a chuck member 3 for the reception of the fore arm of a dental engine. Said parts 1 and 2 are independently pivoted to a pair of plates 4 between which they are mounted, by two pins in the form of screws 5 and 6, and their adjacent ends 1ª and 2ª are made in the form of gears toothed for the greater portion of their edges and meshing with each other.

Lying in a plane substantially at right angles to the plane defined by the two pins 5 and 6 and parallel thereto is a pair of spindles 7 and 8, also mounted in the plates 4 and serving as journals for two pairs of cord pulleys 9, 10, 11, and 12. These latter are held to their respective spindles by screws 13 threaded into the ends of the spindles, and the pair formed by the pulleys 9 and 10 lies on one side of the plates 4 while the pair formed by the pulleys 11 and 12 lies on the opposite side thereof. Owing to this peculiar construction, any angular movement of the part 1 of the wrist joint relatively to the part 2 causes the two plates 4 to move on the pivot pin 6 through an angle one-half of that moved through by said part 1; this action being due to the intermeshing of the toothed ends 1ª and 2ª of these parts of the joint. With the peculiar connection between the parts 1 and 2 of the wrist joint one of said parts may be moved through an angle of 360° relatively to the other and the arrangement of pulleys is such that this movement does not cause the driving cord to run off of them in any position which they may assume. The pulleys 9 and 11 are preferably mounted on the plates 4 in such positions that the lines from the pivots 5 and 6 to the center of either spindle form a predetermined angle and the distance of each pivot from the center of either spindle is equal to 1.11 times the distance from the center of the cord to the center of either spindle. With such placing of pivots and spindles the movement of one part of the wrist joint relatively to the other causes neither lengthening nor shortening of the driving cord.

Figure 4:
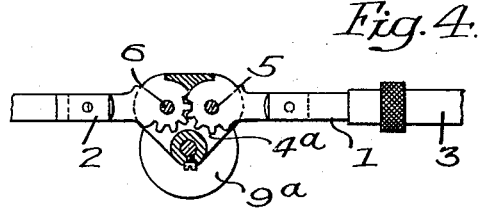
Figure 5:
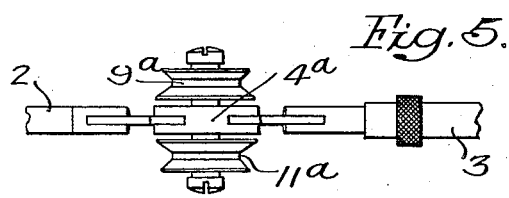

If desired the improved wrist or belt guiding joint construction may be employed in cases where a movement of only 180° is desired and in which two guide pulleys are provided as shown in Figs. 4 and 5. The plates to which the parts 1 and 2 are pivoted are then preferably given a generally triangular form instead of the rectangular shape illustrated in Fig. 1 and the two parts of the joint are connected to said plate by pins in the form of screws 5 and 6 as previously described. The arrangement is such that the two plates 4ª turn on the pivot 6 for example, through one-half of the angle moved through by the other portion, in this case the part 1 of the joint.

While we have referred to our device as a "wrist joint," it is to be understood that in so doing we do not wish to limit its use to a position immediately adjacent a hand piece as it may, without departing from our invention, be used independently of such a structure and in fact may be used as an elbow joint, both with dental engines, as well as with other types of apparatus such as various forms of grinders, swinging saws or the like.

We claim:—

1. A belt guiding joint consisting of two members each having a toothed portion; and a structure pivotally connected to both of said members, the teeth of one of the members meshing with those of the other member; with belt guiding means mounted on the structure in a definite position relatively to the pivots of said toothed members.

2. A belt guiding joint consisting of two members each having a toothed extremity; a structure for connecting said members; pivots connecting said members to the structure in positions to permit of their teeth intermeshing; with a pair of pulleys mounted on the structure with their common axis of rotation parallel and in a definite relation to the long axes of said pivots.

3. The combination in a belt guiding joint of two members each having one end provided with a series of gear teeth; a plate for connecting said members; and pivots respectively connecting the members with the plate; said pivots being respectively concentric with the series of teeth of the members and retaining them in position with their teeth intermeshing; with two pairs of pulleys mounted on said plate on opposite sides of a plane including the long axes of said pivots.

4. The combination in a belt guiding joint of two members each having a toothed portion; a connecting structure; means for pivoting said members to said structure with their teeth intermeshing; and a cord guiding pulley mounted on said structure in a definite position as regards said pivoting means.

5. The combination in a belt guiding joint of two members each having a toothed portion; a connecting structure; pivots connecting said members to said structure with their teeth intermeshing; and a cord guiding pulley mounted on said structure; the distance between the center lines of each of said pivots and the axis of rotation of said pulley being equal to 1.11 times the distance from said pulley axes to the center line of the cord on said pulley.

6. The combination in a belt guiding joint of two members each having a toothed portion; a connecting structure; means for pivoting said members to said structure with their teeth intermeshing; and cord guiding pulleys mounted on said structure with the lines of their axes in a plane bisecting the angle formed by the longitudinal axes of the said tooth carrying members of the joint.

7. The combination in a belt guiding joint of a supporting structure; two members each having a toothed portion and independently pivoted to said structure with their teeth intermeshing; two pulley spindles carried by the structure; and a pair of cord guiding pulleys mounted on each spindle.

8. The combination in a belt guiding joint of a supporting structure; two members each having a toothed portion and independently pivoted to said structure with their teeth intermeshing; two pulley spindles carried by the structure; and a pair of cord guiding pulleys mounted on each spindle; the plane of said two spindles bisecting the angle defined by the longitudinal axes of said members.

9. The combination in a belt guiding joint of a supporting structure; arm members independently pivoted to said structure and positively connected independently thereof to cause one of them to transmit movement to the other; and belt guiding means mounted on opposite sides of said arm members.

10. The combination in a belt guiding joint of two members each having a toothed portion; a connecting structure; means for pivoting said members to said structure with their teeth intermeshing; and cord guiding pulleys mounted on said structure in a definite position relatively to said two members to maintain the length of a belt passing over them substantially invariable when one of said members is moved relatively to the other.

In testimony whereof, we have signed our names to this specification in the presence of two subscribing witnesses.

ADOLPH W. SCHRAMM.
EDWARD B. WILFORD.

Witnesses:
WILLIAM E. BRADLEY,
JOS. H. KLEIN.